US012216842B2

United States Patent
Kaneda et al.

(10) Patent No.: US 12,216,842 B2
(45) Date of Patent: Feb. 4, 2025

(54) ELECTRONIC PEN (71) Applicant: Wacom Co., Ltd., Saitama (JP)

(72) Inventors: Takenori Kaneda, Saitama (JP); Kohei Tanaka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/487,929

(22) Filed: Oct. 16, 2023

(65) Prior Publication Data
US 2024/0152220 A1 May 9, 2024

(30) Foreign Application Priority Data

Nov. 8, 2022 (JP) .................................. 2022-178918
Jun. 1, 2023 (JP) .................................. 2023-090665

(51) Int. Cl.
G06F 3/0354 (2013.01)
(52) U.S. Cl.
CPC ................................. G06F 3/03545 (2013.01)
(58) Field of Classification Search
CPC .................................................... G06F 3/03545
See application file for complete search history.

(56) References Cited

U.S. PATENT DOCUMENTS 10,061,406 B2    8/2018  Arai et al.
11,379,057 B2 *  7/2022  Ninomiya ............. G06F 3/0414
2010/0212976 A1* 8/2010  Baba ................... G06F 3/03545
                                                        178/19.01

FOREIGN PATENT DOCUMENTS

JP          6476140 B2    2/2019

* cited by examiner

Primary Examiner — Sardis F Azongha
(74) Attorney, Agent, or Firm — Seed IP Law Group LLP (57) ABSTRACT Disclosed is an electronic pen including a casing, a core body, a core body holding part disposed in the casing and holding a portion of the core body, electronic parts disposed at a rear stage of the core body holding part in the casing and performing electronic pen functions, an internal constituent part through which the core body penetrates on a pen tip side in the casing, a first ring-shaped elastic component in contact with an entirety of a circumference of a side surface of the internal constituent part and an entirety of a circumference of an inner wall surface of the casing, and a second ring-shaped elastic component in contact with an entirety of a circumference of a side surface of the core body holding part and an entirety of a circumference of an inner wall surface of the internal constituent part.

10 Claims, 4 Drawing Sheets

ELECTRONIC PEN

BACKGROUND

Technical Field

The present disclosure relates to an electronic pen that implements functions as a position indicator for a position detecting device mounted in electronic equipment such as a tablet personal computer (PC), for example.

Description of the Related Art

For example, a position detecting device is mounted in electronic equipment such as a tablet PC. The position detecting device includes a position detecting sensor and a position detecting circuit. The position detecting sensor receives a position indication signal from an electronic pen, and the position detecting circuit detects a position indicated by the electronic pen on the position detecting sensor, on the basis of an output signal from the position detecting sensor according to the position indication signal. Various electronic parts and so forth are mounted in the electronic pen. In the electronic pen, for example, besides a sending circuit that causes the position indication signal to be sent, a pressure detector (writing pressure detector) that detects a pressure (writing pressure) applied to the pen tip is mounted in some cases. Further, a circuit that generates a signal for tilt detection for enabling detection of the tilt of the electronic pen and an electrode that transmits the signal for tilt detection are also mounted in some cases. Besides, various electronic parts such as a control integrated circuit (IC) and a power supply circuit are mounted.

The electronic equipment such as the tablet PC is easy to carry. Therefore, it is used at various indoor spaces, for example, a kitchen and so forth, and is frequently brought out to an outdoor place to be used. Thus, some pieces of electronic equipment such as tablet PCs have a waterproof function and a dust-proof function. Hence, it is considered that an electronic pen used with such electronic equipment, e.g., the tablet PC, is also equipped with a waterproof function and a dust-proof function. In Japanese Patent No. 6476140 (hereinafter, referred to as Patent Document 1), an disclosure relating to an electronic pen (position indicator) for which waterproofing and dust-proofing are implemented is disclosed. Specifically, Patent Document 1 discloses an disclosure relating to an electronic pen (position indicator) in which an elastic part is disposed to cover an inner surface of a case across the whole circumference in the circumferential direction and to close an opening of the case in the vicinity of the rear end of a core body. With the elastic part disposed in such a manner as to close the opening of the case, entry of water and dust into the case from the opening can be prevented.

The invention disclosed in the above-described Patent Document 1 is an effective technique because an effect of waterproofing and dust-proofing of the electronic pen is obtained by the simple configuration in which the elastic part is disposed to close the opening of the case basically. Because the configuration is simple, the invention disclosed in Patent Document 1 is suitably applied to an extremely-thin electronic pen used with a smartphone, for example. However, when the invention disclosed in Patent Document 1 is applied to an electronic pen that is used with a tablet PC or the like and that has a size equivalent to that of a general ballpoint pen or the like, the elastic part disposed to close the opening also becomes a large part depending on the casing and the opening. In this case, there is a possibility that conveyance of the writing pressure applied to the core body to the writing pressure detector becomes difficult because the elastic part directly acts on the core body.

BRIEF SUMMARY

In view of the above, the present disclosure provides an electronic pen having a waterproof function and a dust-proof function with a simple configuration without lowering functions as the electronic pen.

In order to solve the above-described problem, there is provided an electronic pen including a tubular casing having an opening on the pen tip side, a bar-shaped core body, a core body holding part that is disposed in the casing and holds a rear end portion of the core body such that a tip portion of the core body protrudes from the opening of the casing, and electronic parts that are disposed at the rear stage of the core body holding part in the casing and that, in operation, perform electronic pen functions. The electronic pen also includes a tubular internal constituent part through which the core body penetrates on the pen tip side in the casing, a first ring-shaped elastic component in contact with an entirety of a circumference of a side surface of the internal constituent part and an entirety of a circumference of an inner wall surface of the casing, and a second ring-shaped elastic component in contact with the whole circumference of a side surface of the core body holding part and the whole circumference of an inner wall surface of the internal constituent part.

With the electronic pen according to the present disclosure, the rear end portion of the core body is attached to the core body holding part disposed in the casing and is held such that the tip portion of the core body protrudes from the opening of the casing. The electronic parts that performs the electronic pen functions are disposed at the rear stage of the core body holding part in the casing. Further, the tubular internal constituent part through which the core body penetrates is disposed on the pen tip side in the casing. The first ring-shaped elastic component is disposed to be in close contact with the whole circumference of the side surface of the internal constituent part and the whole circumference of the inner wall surface of the casing. Moreover, the second ring-shaped elastic component is disposed to be in close contact with the whole circumference of the side surface of the core body holding part and the whole circumference of the inner wall surface of the internal constituent part. Water and dust that enter from the opening of the casing are kept from reaching the electronic parts at the rear stage of the core body holding part, by these first ring-shaped elastic component and second ring-shaped elastic component.

DETAILED DESCRIPTION

Electronic pens according to embodiments of the present disclosure will be described below with reference to the drawings. In the following embodiments, there will be described an example in which the present disclosure is applied to an electronic pen of an active capacitive system that indicates a position on a position detecting sensor by transmitting a position indication signal formed by a mounted sending circuit toward the position detecting sensor through a core body. In the embodiments to be described below, the circuit that forms the position indication signal is defined as a "sending circuit." This is because there is not only the case in which a signal generated by an oscillator is directly used as the position indication signal, but also the case in which the signal generated by the oscillator is variously modulated to form a desired position indication signal and is then transmitted. For this reason, the word of "sending" that means sending out information broadly is used.

First Embodiment

Configuration Example of Electronic Pen 1

Figure 1:
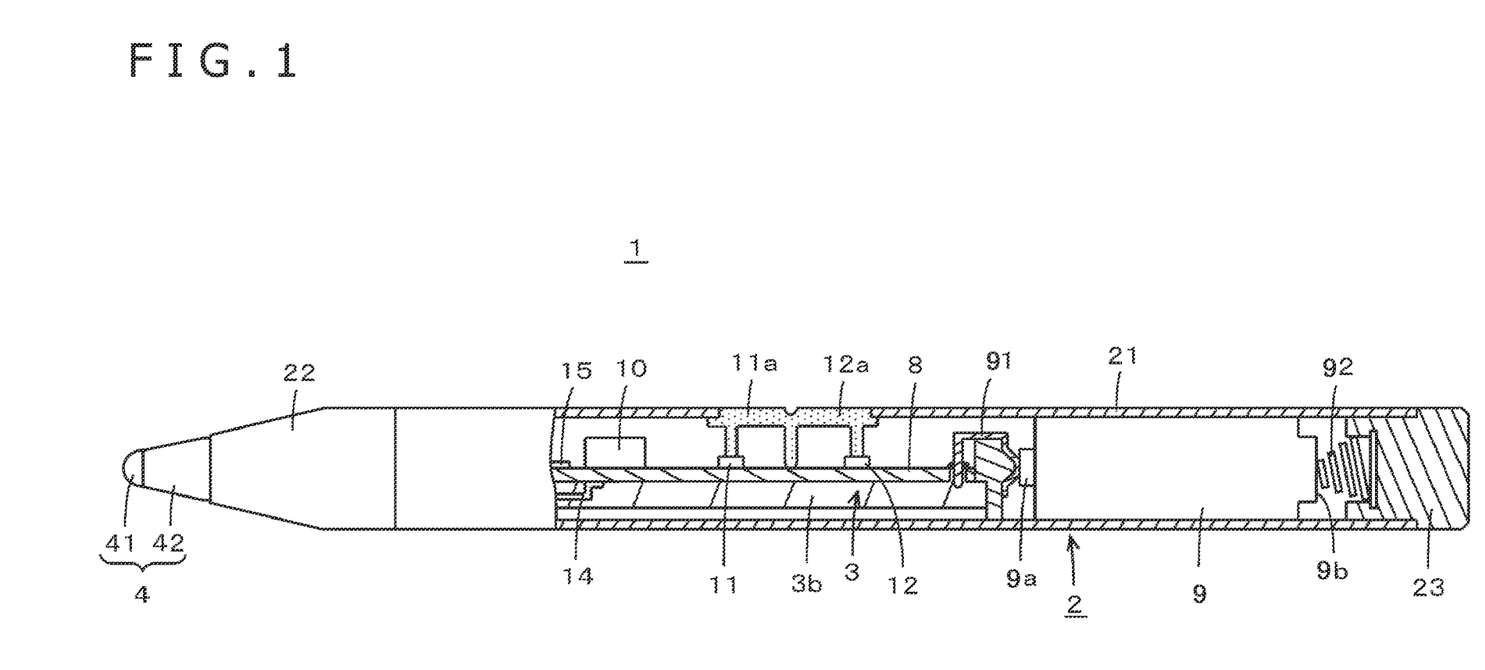
FIG. 1 is a diagram for explaining a configuration example of an electronic pen of an embodiment.
Figure 2:
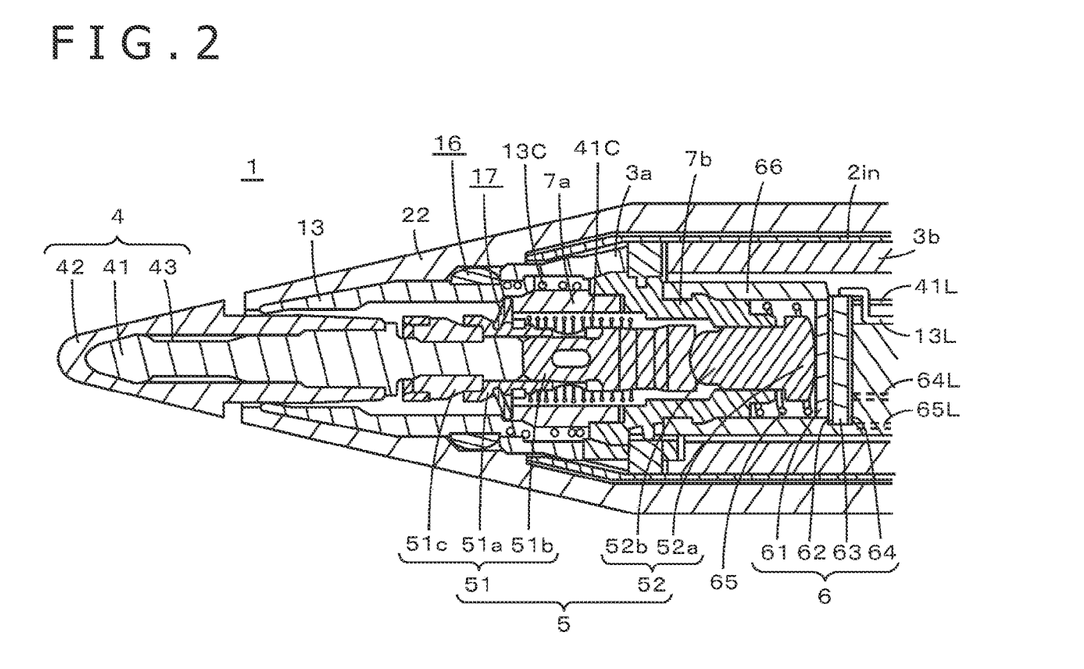
FIG. 2 is a diagram for explaining major parts, on the pen tip side, of an electronic pen of a first embodiment.
Figure 3:
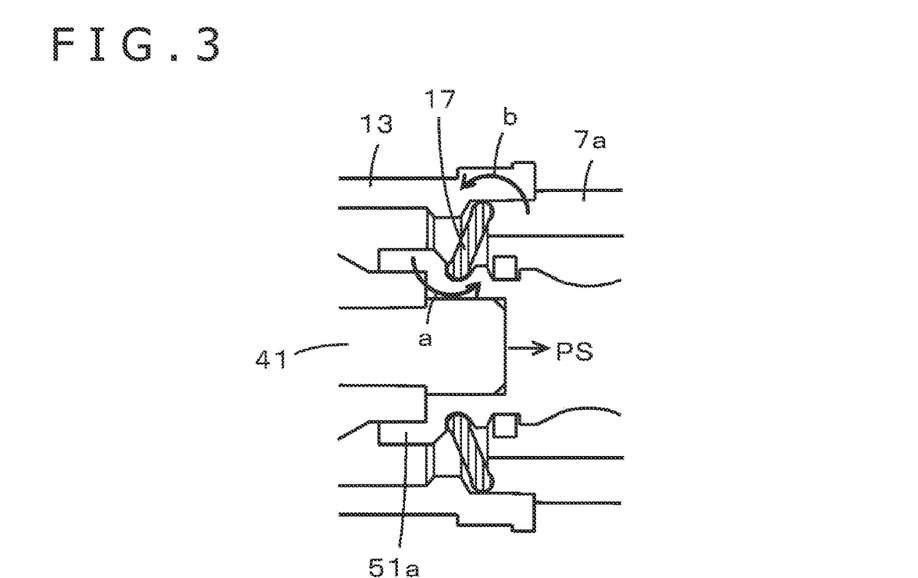
FIG. 3 is an enlarged sectional view of a setting place of a second ring-shaped elastic component of the electronic pen of the first embodiment.

FIG. 1 is a diagram for explaining a configuration example of an electronic pen 1 of a first embodiment and illustrates, partly in cross section, the internal of a case (casing) 2 of the electronic pen 1. FIG. 2 is a diagram (enlarged sectional view) for explaining major parts, on the pen tip side, of the electronic pen 1. Further, FIG. 3 is an enlarged sectional view of the setting place of a second ring-shaped elastic component 17, which will be described in detail later, of the electronic pen 1 of the first embodiment.

As illustrated in FIG. 1, the electronic pen 1 includes the case (casing) 2 that is thin and long in an axial center direction (direction along the axial center) and that has a circular cylindrical shape having an opening on one side in the axial center direction, i.e., the pen tip side, and being closed on the other side in the axial center direction. The case 2 includes a circular cylindrical case main body 21 that internally has a hollow portion and a front cap 22 and a rear cap 23 that are coupled to the case main body 21. The case 2 is formed with the front cap 22 and the rear cap 23 fitted to the case main body 21.

In the hollow portion of the case 2, a battery 9 and a board holder 3 for holding thereon mounted parts such as a printed circuit board 8 are housed as illustrated in FIG. 1, and parts for implementing functions as an electronic pen are housed on the pen tip side. The case main body 21 and the rear cap 23 are formed of an electrically-conductive material. In this embodiment, the case main body 21 and the rear cap 23 are formed of aluminum for which anodization processing has been executed, for example. Further, the front cap 22 is formed of a non-electrically-conductive material. In this embodiment, the front cap 22 is formed of plastic, for example.

As illustrated in FIG. 1, a terminal conductor 91 is disposed at an end portion of the board holder 3 on the opposite side to the pen tip side. This terminal conductor 91 electrically abuts against a positive-side terminal 9a of the battery 9 and is electrically connected to a copper foil pattern of a power supply line of the printed circuit board 8. At a portion fitted to the case main body 21 in the rear cap 23, a coil spring terminal 92 that is electrically connected to a negative-side terminal 9b of the battery 9 and that is formed of an electrically-conductive metal is disposed. As illustrated in FIG. 1, the battery 9 is inserted into the case 2 with the positive-side terminal 9a connected to the terminal conductor 91. Thereafter, the rear cap 23 is fitted to the case main body 21 in such a manner as to press the negative-side terminal 9b of the battery 9 by the coil spring terminal 92.

In this embodiment, the case main body 21 formed of the electrically-conductive material is electrically connected to an earth conductor of the printed circuit board 8. Because the rear cap 23 and the case main body 21 are formed of the electrically-conductive material, the negative-side terminal 9b of the battery 9 is electrically connected to the earth conductor of the printed circuit board 8 through the rear cap 23 and the case main body 21. Meanwhile, the positive-side terminal 9a of the battery 9 is connected to the copper foil pattern of the power supply line of the printed circuit board 8 through the terminal conductor 91. With this, the voltage of the battery 9 is provided as a supply voltage of a circuit formed on the printed circuit board 8.

Although not illustrated in FIG. 1, a circuitry part that includes a sending circuit (signal generating circuit) 8s, a detecting circuit 8d, a demodulating circuit 8r, a switch circuit SW, a control IC 10 illustrated in FIG. 1, and other peripheral circuit parts is disposed on the printed circuit board 8. The sending circuit 8s generates a signal to be sent out from an electronic pen core body (hereinafter, referred to as a core body) 4 of the electronic pen 1 and a signal to be sent out from a transmitting-receiving electrode 13 to be described later. The sending circuit 8s can supply signals with different frequencies to the core body 4 and the transmitting-receiving electrode 13. The detecting circuit 8d detects the capacitance of a pressure detector 6, which will be described later, to detect a writing pressure. The demodulating circuit 8r demodulates a signal received through the transmitting-receiving electrode 13, and supplying information obtained by the demodulation to the control IC 10.

Also as described later, the switch circuit SW switches whether to supply a signal from the sending circuit 8s to the transmitting-receiving electrode 13 or to supply a signal received through the transmitting-receiving electrode 13 to the demodulating circuit 8r, under the control of the control IC 10. Further, the control IC 10 configures a control circuit that controls the respective circuit parts such as the sending circuit 8s and the switch circuit SW. In a peripheral circuit part, push switches (side switches) 11 and 12 subjected to pressing-down operation through operation parts 11a and 12a disposed in a side surface of the case main body 21 as illustrated in FIG. 1 are included.

Moreover, although not illustrated in FIG. 1, an electrically-conductive line that connects the core body 4 and the sending circuit 8s and an electrically-conductive line that connects the transmitting-receiving electrode 13 and the switch circuit SW are connected to the printed circuit board 8. The transmitting-receiving electrode 13 is connected to the sending circuit 8s and the demodulating circuit 8r through the switch circuit SW. Further, although not illustrated in FIG. 1, electrically-conductive lines that connect the detecting circuit 8d of the capacitance with a first electrode and a second electrode of the pressure detector (writing pressure detector) having a configuration of a variable-capacitance capacitor, which will be described in detail later, are connected to the printed circuit board 8.

As illustrated in FIG. 2, the front cap 22 is a tubular body having a through-hole that allows the core body 4 to penetrate therethrough in the axial center direction, and the appearance shape of the front cap 22 on the pen tip side of the electronic pen 1 has a tapered shape in which the outer diameter becomes smaller toward the pen tip. An end portion of the front cap 22 on the pen tip side is an opening of the through-hole that allows the core body 4 to penetrate therethrough. The major parts for implementing electronic pen functions as described above are also mounted on the side of the front cap 22.

As illustrated in FIG. 2, in the case 2 on the side of the front cap 22, the core body 4, a transmitting component 5, and the pressure detector 6 have the same center axis and are disposed to be lined up in series in the axial center direction. As illustrated in FIG. 2, the core body 4 includes a core bar 41 formed of an electrically-conductive material and a protective component 42 formed of a non-electrically-conductive material, and has a structure in which a space (air layer) 43 is made between the core bar 41 and the protective component 42. In this case, a signal (electric field) radiated from a portion on the tip side relative to a wide width portion of an egg-shaped pen tip of the core bar 41 is radiated comparatively efficiently through only the protective component 42.

However, the space 43 and the protective component 42 act on a signal (electric field) radiated from a thin portion on the rear end side relative to the egg-shaped pen tip of the core bar 41, and this signal is inhibited. This is because the dielectric constant is different between the space 43 and the protective component 42 and this portion functions as a double capacitor. With this, even when the electronic pen 1 is tilted, the favorable position indication signal that does not become broad beyond necessity compared with the core bar 41 can be sent out.

The transmitting component 5 includes components of two separate bodies, i.e., a core body holding component 51 located on the pen tip side and a pressing component 52 located at the rear stage of the core body holding component 51. In the first embodiment, the core body holding component 51 and the pressing component 52 are formed of, for example, a hard resin that is a non-electrically-conductive material. The core body holding component 51 includes a cup-shaped holding part 51a including a recessed portion, and an extended part 51b that is mounted to be fitted to the rear end side of the holding part 51a and that is extended in the opposite direction to the pen tip. A ring-shaped elastic component 51c having electrical conductivity, such as electrically-conductive rubber, is fixed to an inside side surface of the recessed portion of the holding part 51a. The elastic component 51c slightly protrudes (sticks out) from the inside side surface of the recessed portion of the holding part 51a.

With this, as illustrated in FIG. 2, when a rear end portion of the core body 4 is inserted into the recessed portion of the holding part 51a of the core body holding component 51, the elastic component 51c tightens the circumference of the rear end portion of the core body 4, and the core body 4 can be mounted in the core body holding component 51. Further, when the pen tip portion of the core body 4 mounted in the core body holding component 51 is picked in such a manner as to get caught on a nail, for example, and the core body 4 is then withdrawn, the core body 4 can be removed from the core body holding component 51. With the ring-shaped elastic component 51c disposed on the inside side surface of the recessed portion of the holding part 51a of the core body holding component 51 as described above, the core body 4 can be mounted into and removed from the core body holding component 51.

A coil spring 41C for the core body is disposed around mainly the extended part 51b of the core body holding component 51 as illustrated in FIG. 2. In other words, mainly the extended part 51b of the core body holding component 51 penetrates through a center axis portion of the coil spring 41C for the core body. In this case, one turn (one roll) of the coil spring 41C for the core body on the side of the holding part 51a is fitted to a recessed portion made in the side surface of the holding part 51a of the core body holding component 51, and the coil spring 41C for the core body holds the core body holding component 51. However, the core body holding component 51 is kept from being biased by the coil spring 41C for the core body. That is, the core body holding component 51 is held in the case 2 in such a state as to hang from the coil spring 41C for the core body.

Moreover, an end portion of the coil spring 41C for the core body on the pen tip side is connected to the electrically-conductive elastic component 51c disposed on the holding part 51a of the core body holding component 51, and the other end portion thereof is connected to the sending circuit 8s of the printed circuit board 8. In FIG. 2, the other end portion of the coil spring 41C for the core body corresponds to an end portion of an extended line (conductor line) 41L of the coil spring for the core body extended from the coil spring 41C for the core body. With this, the position indication signal from the sending circuit 8s of the printed circuit board 8 is supplied to the core bar 41 of the core body 4 through the coil spring 41C for the core body and the elastic component 51c and is transmitted from the core bar 41 of the core body 4 toward the position detecting sensor.

The pressing component 52 is located at the rear stage of the core body holding component 51. The pressing component 52 has a mushroom-like shape and includes a pressing head part 52a that is located on the side of the pressure detector 6 and that has a long diameter and a stem-shaped part 52b that is extended from an end surface of the pressing head part 52a on the pen tip side toward the pen tip side and that has a diameter shorter than that of the pressing head part 52a. A surface (rear end surface) of the pressing head part 52a opposite to the pen tip side is a curved surface whose center corresponds to the apex thereof. As illustrated in FIG. 2, in the state in which a writing pressure is not applied to the core body 4, the core body 4, the core body holding component 51, and the pressing component 52 have the same axial center and are located in series in the axial center direction. When a writing pressure is applied to the core body 4 and the core body 4 is pushed toward the rear end side of the electronic pen 1, the core body holding component 51 and the pressing component 52 are pushed toward the rear end side of the electronic pen 1, and the pressing component 52 presses the pressure detector 6.

As illustrated in FIG. 2, an end surface of the stem-shaped part 52b of the pressing component 52 on the pen tip side is a protruding curved surface whose center corresponds to the apex thereof. Conversely, an end surface of the extended part 51b of the core body holding component 51 on the rear end side, the end surface facing the end surface of the stem-shaped part 52b on the pen tip side, is a recessed curved surface whose center corresponds to the apex thereof. With this, even when a writing pressure is applied to the pen tip of the core body 4 in a direction that intersects the axial center direction at the time of writing and the core body 4 and the core body holding component 51 slightly tilt, the writing pressure applied to the core body 4 can properly be transmitted to the pressure detector 6 through the pressing component 52 without attenuating the writing pressure.

The pressure detector 6 is a variable-capacitance capacitor and includes a first electrode 61 of a circular flat plate, a ring-shaped spacer 62, a dielectric 63 of a circular flat plate having one surface facing the first electrode 61 with the interposition of the ring-shaped spacer 62, and a second electrode 64 of a flat plate being stuck to the other surface of the dielectric 63. The first electrode 61 is formed of an electrically-conductive elastic material such as electrically-conductive rubber, for example. Thus, when a writing pressure is applied to the core body 4 mounted in the core body holding component 51, the first electrode 61 of the pressure detector 6 is pressed by the pressing component 52 pushed toward the rear end side by the core body holding component 51 and comes closer to the dielectric 63. Further, when the writing pressure applied to the core body 4 is released, the first electrode 61 pushes back the transmitting component 5 and the core body 4 and acts on the transmitting component 5 and the core body 4 to return them to the original position.

The pressure (writing pressure) applied to the core body 4 can be detected on a real time basis according to the capacitance between the first electrode 61 and the second electrode 64 that changes due to the approach and separation of the first electrode 61 to and from the dielectric 63 in the above-described manner. A coil spring 65 for the pressure detector that is formed of an electrically-conductive material such as metal is caused to be in contact with the first electrode 61 of the pressure detector 6. In this case, an extended line (electrically-conductive line) 65L from the coil spring 65 for the pressure detector and an extended line (electrically-conductive line) 64L from the second electrode 64 are connected to the detecting circuit 8*d* of the capacitance on the printed circuit board 8. This makes it possible to detect the pressure (writing pressure) applied to the core body 4, on the basis of the capacitance between the first electrode 61 and the second electrode 64 of the pressure detector 6.

Moreover, the major parts that are disposed on the side of the front cap 22 and are for implementing the electronic pen functions are housed in an inside space formed by the transmitting-receiving electrode 13, pipe-shaped holding components 7*a* and 7*b*, and a cup-shaped pressure detector holding component 66 that are coupled to one another. That is, as illustrated in FIG. 2, the transmitting component 5, the pressure detector 6, the coil spring 41C for the core body, and the coil spring 65 for the pressure detector are housed in the inside space formed by the transmitting-receiving electrode 13, the pipe-shaped holding components 7*a* and 7*b*, and the cup-shaped pressure detector holding component 66.

The transmitting-receiving electrode 13 has a pipe shape and formed of an electrically-conductive material such as metal, for example. The transmitting-receiving electrode 13 on the pen tip side dwindles (has a tapered shape). As illustrated in FIG. 2, a tip surface of the transmitting-receiving electrode 13 on the pen tip side abuts against an inside tip surface of the front cap 22. Further, an outside side surface of the transmitting-receiving electrode 13 in a certain range of the pen tip side to the rear end side is caused to be in contact with the inner wall surface of the front cap 22. With this, the transmitting-receiving electrode 13 does not rattle in a direction that intersects the axial center direction. Moreover, a portion of the transmitting-receiving electrode 13 on the pen tip side that is facing the core body 4 has a short inner diameter and a large wall thickness, and a portion of the transmitting-receiving electrode 13 on the rear end side that is facing the holding part 51*a* of the transmitting component 5 has a long inner diameter and a small wall thickness.

The pipe-shaped holding components 7*a* and 7*b* formed of, for example, a hard resin are disposed at the rear stage of the transmitting-receiving electrode 13. A tip surface of the pipe-shaped holding component 7*a* located on the pen tip side abuts against a rear end surface of the transmitting-receiving electrode 13 as illustrated in FIG. 2. Further, a rear end portion of the pipe-shaped holding component 7*a* located on the pen tip side is fitted and coupled to a tip portion of the pipe-shaped holding component 7*b* located on the rear end side as illustrated in FIG. 2. Moreover, a rear end portion of the pipe-shaped holding component 7*b* located on the rear end side is fitted to the inside of the pressure detector holding component 66 and holds the pressing component 52.

The pressing head part 52*a* of the pressing component 52 protrudes from the rear end opening of the pipe-shaped holding component 7*b*. The diameter of the pressing head part 52*a* of the pressing component 52 is longer than that of the rear end opening of the pipe-shaped holding component 7*b*, and thus, the pressing head part 52*a* is prevented from being located inside the pipe-shaped holding component 7*b*. Further, as illustrated in FIG. 2, the above-described coil spring 65 for the pressure detector, which is formed of an electrically-conductive material, is disposed in such a form as to be sandwiched by the pipe-shaped holding component 7*b* and the first electrode 61 of the pressure detector 6. The extended line (electrically-conductive line) 65L of the coil spring 65 for the pressure detector is connected to the detecting circuit 8*d* of the capacitance on the printed circuit board 8 as an extended line from the first electrode 61 as described above. In addition, the extended line 64L from the second electrode 64 of the pressure detector 6 is also connected to the detecting circuit 8*d* of the capacitance on the printed circuit board 8.

Moreover, as illustrated in FIG. 2, the pressure detector holding component 66 formed into a cup shape by, for example, a hard resin is put from the side of the pressure detector 6, and also as described above, the thin portion of the pipe-shaped holding component 7*b* on the rear end side is fitted thereto. That is, the outer diameter of the thin portion of the pipe-shaped holding component 7*b* on the rear end side is slightly shorter than the inner diameter of a recessed portion of the pressure detector holding component 66, and the rear end side of the pipe-shaped holding component 7*b* is fitted into the pressure detector holding component 66 with the cup shape. When the pressure detector holding component 66 is fitted to and pushed toward the rear end side of the pipe-shaped holding component 7*b*, a tip surface of the pressure detector holding component 66 abuts against a rear end surface of a thick portion of the pipe-shaped holding component 7*b*.

At the time of this state, the pressure detector 6 is fixed to an inside bottom surface portion of the pressure detector holding component 66 on the rear end side. Simultaneously, the coil spring 65 for the pressure detector sandwiched between the pipe-shaped holding component 7*b* and the pressure detector 6 holds the first electrode 61 at a proper position in such a manner as to moderately press the first electrode 61 against the side of the dielectric 63 with the interposition of the ring-shaped spacer 62. At the time of this state, the apex part of the pressing head part 52*a* of the pressing component 52 is slightly in contact with the first electrode 61. Therefore, the pressing component 52 immediately presses the first electrode 61 of the pressure detector 6 according to the pressure applied to the core body 4, and detection of the pressure (writing pressure) is enabled. The board holder 3 is pressed against the pressure detector holding component 66 from the rear end side, and the pressure detector holding component 66 is fixed so as not to move.

Moreover, as illustrated in FIG. 2, a coil spring 13C for the transmitting-receiving electrode is disposed around a side surface of the pipe-shaped holding component 7a. One end portion of the coil spring 13C is connected to the transmitting-receiving electrode 13. The other end part of the coil spring 13C corresponds to an end portion of an extended line (conductor line) 13L extended from the coil spring 13C in FIG. 2 and is connected to the sending circuit 8s disposed on the printed circuit board 8. As described above, a constituent part including the core body 4, the transmitting component 5, the pressure detector 6, the coil spring 41C for the core body, the transmitting-receiving electrode 13, the coil spring 13C for the transmitting-receiving electrode, and so forth is held in the casing 2 by pen-tip-side holding parts 3a and 3b of the board holder 3. In the electronic pen 1 of the first embodiment, the part that configures the above-described electronic pen functions is housed in an inside casing 2in, which makes mounting into the casing 2 easy.

As described above, the transmitting-receiving electrode 13, the pipe-shaped holding components 7a and 7b, and the pressure detector holding component 66 are coupled to one another and are fixed and disposed on the side of the front cap 22 in such a form as to be sandwiched by the inside tip surface of the front cap 22 and the board holder 3. The transmitting component 5 and the pressure detector 6 are disposed in the internal space formed by the transmitting-receiving electrode 13, the pipe-shaped holding components 7a and 7b, and the pressure detector holding component 66 that are coupled to one another, as described above with use of FIG. 2, and the core body 4 is attachable and detachable to and from the core body holding component 51.

In this case, a relatively wide space (clearance) having room is made around the core body holding component 51 in which the core body 4 is mounted, as illustrated in FIG. 2. With this, the core body holding component 51 can make slide movement by being pushed toward the rear end side and pushed back in the axial center direction, without receiving a stress, in response to application of a pressure (writing pressure) to the core body 4 and release thereof. However, the core body 4 makes slide movement in the axial center direction according to the applied writing pressure, and therefore, a slight gap is generated between the opening of the front cap 22 and the side surface of the core body 4.

There is a possibility that water enters through this gap and that the water reaches the coil spring 41C for the core body, the pressure detector 6, and further the printed circuit board 8 from the space around the core body holding component 51 in which the core body 4 is mounted. Further, there is also a possibility that water that has entered from the gap between the opening of the front cap 22 and the side surface of the core body 4 reaches the coil spring 13C at the rear stage, the pressure detector 6, and further the printed circuit board 8 through between the transmitting-receiving electrode 13 and the inner wall surface of the front cap 22.

When the coil spring 41C or 13C, the pressure detector 6, or the printed circuit board 8 that transmits a signal gets wet with water, problems that an electrical characteristic changes, that short-circuiting partly occurs in the electronic circuit and the electronic pen 1 thus stops functioning as the electronic pen, and so forth are caused. Thus, in the electronic pen 1 of the first embodiment, a first ring-shaped elastic component 16 is mounted on a rear end side surface of the transmitting-receiving electrode 13 as illustrated in FIG. 2. An inner wall surface of the first ring-shaped elastic component 16 is in close contact with a side surface of the transmitting-receiving electrode 13 on the rear end side across the whole circumference, and an outer wall surface thereof is in close contact with the inner wall surface of the front cap 22 across the whole circumference.

As illustrated in FIG. 2, in a section of the first ring-shaped elastic component 16 taken along the axial center direction passing through the center of an opening of the first ring-shaped elastic component 16, a side surface (outer wall surface) of the first ring-shaped elastic component 16 on the side in close contact with the inner wall surface of the front cap 22 has a circular arc shape. With this shape, it becomes easy to mount the transmitting-receiving electrode 13 on which the first ring-shaped elastic component 16 is mounted, into the front cap 22, and it becomes possible to enhance the close contact between the outer wall surface of the first ring-shaped elastic component 16 and the inner wall surface of the front cap 22. As described above, the first ring-shaped elastic component 16 implements a function of closing the gap between the side surface of the transmitting-receiving electrode 13 and the inner wall surface of the front cap 22. This prevents water that has entered from the opening of the front cap 22 from entering the pressure detector 6 and the printed circuit board 8 through between the transmitting-receiving electrode 13 and the inner wall surface of the front cap 22.

Moreover, as illustrated in FIG. 2, the second ring-shaped elastic component 17 in close contact with the whole circumference of the side surface, slightly on the rear end side, of the holding part 51a of the core body holding component 51 of the transmitting component 5 and the whole circumference of the inner wall surface of the transmitting-receiving electrode 13 on the rear end side is disposed. The second ring-shaped elastic component 17 has a small opening on the pen tip side and a large opening on the rear end side, and thus has an inclined side surface as illustrated in FIG. 2. That is, the second ring-shaped elastic component 17 has a shape like a dish from which the bottom (bottom surface) is removed. In this case, the inner edge side of the opening on the pen tip side is in close contact with the whole circumference of the side surface of the holding part 51a of the core body holding component 51, and the outer edge side of the opening on the rear end side is in close contact with the whole circumference of the inner wall surface of the transmitting-receiving electrode 13 on the rear end side. This prevents water that has entered from the opening of the front cap 22 from entering the pressure detector 6 and the printed circuit board 8 through a space between the core body 4 and the transmitting component 5 and the transmitting-receiving electrode 13.

FIG. 3 is an enlarged sectional view of the setting place of the second ring-shaped elastic component 17 of the electronic pen 1 of the first embodiment. As illustrated in FIG. 3, the inner edge of the opening of the second ring-shaped elastic component 17 on the pen tip side is fitted into a recessed portion made in the side surface of the holding part 51a of the core body holding component 51 and gets close contact with the whole circumference of the side surface of the holding part 51a. Meanwhile, the outer edge of the opening of the second ring-shaped elastic component 17 on the rear end side is fitted into a recessed portion of the transmitting-receiving electrode 13 on the rear end side and is held down by the tip surface of the pipe-shaped holding component 7a from the rear end side, to thereby get close contact with the whole circumference of the inner wall surface of the transmitting-receiving electrode 13 on the rear end side.

Further, an inner edge portion of the opening of the second ring-shaped elastic component 17 on the pen tip side is processed to become spherical. Similarly, an outer edge portion of the opening of the second ring-shaped elastic component 17 on the rear end side is also processed to become spherical. As described above, the shape of the second ring-shaped elastic component 17 is different from that of the first ring-shaped elastic component 16. The second ring-shaped elastic component 17 is in close contact with the portion of the holding part 51a of the core body holding component 51 of the transmitting component 5 by which the core body 4 is held. Therefore, the second ring-shaped elastic component 17 needs to get deformed in association with slide movement of the core body 4 and the transmitting component 5 in the axial center direction according to the writing pressure applied to the core body 4, and thus has the shape in which the side surface is inclined to easily get deformed.

Moreover, the second ring-shaped elastic component 17 is processed such that the inner edge portion of the opening on the pen tip side and the outer edge portion of the opening on the rear end side have a spherical shape, in order not to inhibit the deformation of the second ring-shaped elastic component 17 caused in association with the movement of the core body 4 and the transmitting component 5 in the axial center direction. When the core bar 41 is pushed in a direction indicated by an arrow PS in response to the application of a writing pressure to the core body 4 as illustrated in FIG. 3, the second ring-shaped elastic component 17 gets deformed in such a manner that the inner edge portion of the opening on the pen tip side is pushed toward the rear end side.

In this case, the inner edge portion of the opening of the second ring-shaped elastic component 17 on the pen tip side slightly rotates as illustrated by an arrow a in FIG. 3. Further, the outer edge portion of the opening of the second ring-shaped elastic component 17 on the rear end side slightly rotates as illustrated by an arrow b in FIG. 3. This makes it possible not to inhibit the deformation of the second ring-shaped elastic component 17 caused in association with the movement of the core body 4 and the transmitting component 5 in the axial center direction. That is, the second ring-shaped elastic component 17 has such a shape that the core body 4 and the transmitting component 5 can properly make slide movement in the axial center direction according to the applied writing pressure.

Figure 4:
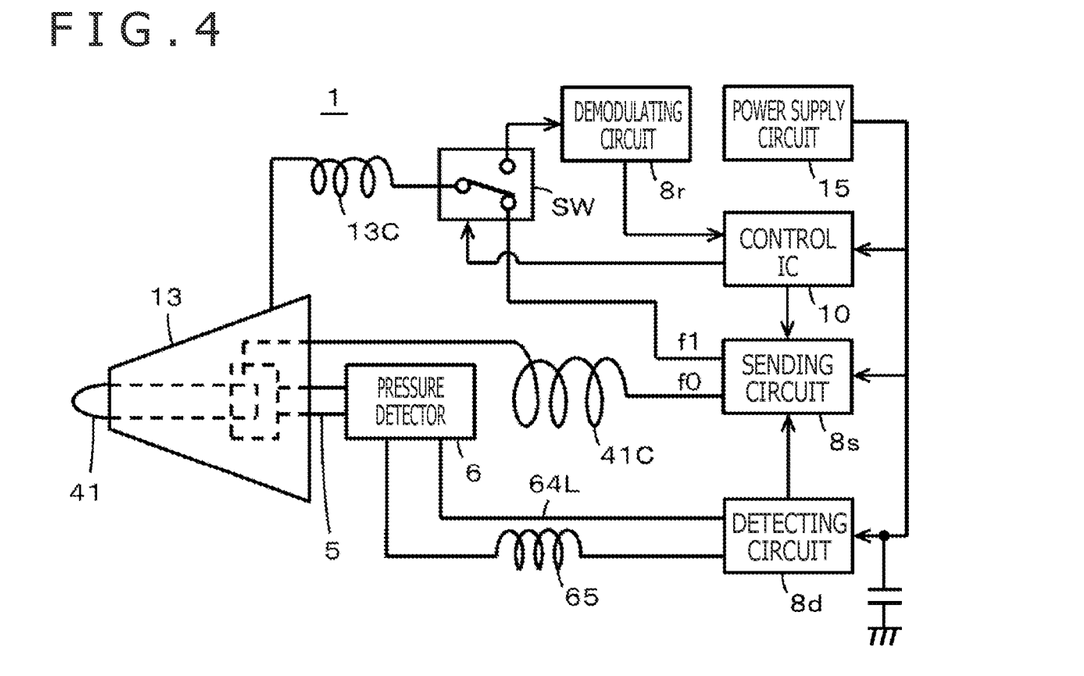
FIG. 4 is a diagram for explaining an equivalent circuit of the electronic pen of the first embodiment.

FIG. 4 is a diagram illustrating an equivalent circuit of the electronic pen 1 of the first embodiment described with use of FIG. 1 to FIG. 3. As illustrated in FIG. 4, the core bar 41 of the core body 4 is connected to the sending circuit 8s through the coil spring 41C for the core body and is configured to send out the position indication signal with a frequency of f0, for example. Further, the transmitting-receiving electrode 13 is connected to the switch circuit SW through the coil spring 13C and is further connected to the sending circuit 8s and the demodulating circuit 8r through this switch circuit SW. Switching control of the switch circuit SW is executed by the control IC 10.

Therefore, when the switch circuit SW is switched to the side of the sending circuit 8s, the transmitting-receiving electrode 13 can send out a tilt detection signal with a frequency of f1, for example, from the sending circuit 8s. Moreover, when the switch circuit SW is switched to the side of the demodulating circuit 8r, a signal from a position detecting device received through the transmitting-receiving electrode 13 can be supplied to the demodulating circuit 8r. With this, a transmission request of identification information can be received from the position detecting circuit side through the transmitting-receiving electrode 13, the transmission request can be demodulated by the demodulating circuit 8r, and the demodulation result can be notified to the control IC 10. In this case, the control IC 10 can control the sending circuit 8s and transmit the position indication signal including identification information of the self-device to the position detecting device. As described above, the transmitting-receiving electrode 13 is capable of transmitting the signal for tilt detection and receiving the identification signal from the position detecting circuit side.

Moreover, the first electrode 61 of the pressure detector 6 pressed by the transmitting component 5 according to the writing pressure applied to the core body 4 is connected to the detecting circuit 8d of the capacitance through the coil spring 65 for the pressure detector. In addition, the second electrode 64 of the pressure detector 6 is connected to the detecting circuit 8d of the capacitance through the extended line 64L of the second electrode 64. With this, in the detecting circuit 8d, the pressure (writing pressure) applied to the core body 4 can be detected according to change in the capacitance.

The pressure (writing pressure) applied to the core body 4 and detected in the detecting circuit 8d is included in the position indication signal in the sending circuit 8s and is allowed to be transmitted from the core body 4 to the position detecting sensor. Further, control of the sending circuit 8s is executed by the control IC 10, and supply of drive power to each circuit part is executed by a power supply circuit 15. In the electronic pen 1 of this embodiment, each of the coil spring 41C for the core body, the coil spring 13C, and the coil spring 65 for the pressure detector does not function as an inductor element.

That is, the coil spring 41C for the core body implements a function of holding the core body holding component 51 in the casing 2 without biasing the core body holding component 51 in the state in which the core body holding component 51 can move with high flexibility, and a function of supplying the position indication signal from the sending circuit 8s to the core bar 41 of the core body 4. Moreover, the coil spring 13C implements a function of supplying the tilt detection signal from the sending circuit 8s to the transmitting-receiving electrode 13 without affecting the surroundings and without difficulty.

In addition, the coil spring 13C implements a function of supplying a signal received through the transmitting-receiving electrode 13 to the demodulating circuit 8r without affecting the surroundings and without difficulty. The coil spring 65 for the pressure detector implements a function of allowing the first electrode 61 of the pressure detector 6 to be biased toward the side of the dielectric 63 and be positioned to a proper position by a proper force and connecting the first electrode 61 to the detecting circuit 8d of the capacitance.

Effects of Electronic Pen 1 of First Embodiment

As described above, the electronic pen 1 of the first embodiment described with use of FIG. 1 to FIG. 4 prevents water that enters from the opening of the front cap 22 from entering the rear stage by the functions of the first ring-shaped elastic component 16 and the second ring-shaped elastic component 17. Therefore, water that has entered from the opening of the front cap 22 does not reach electronic parts that are present at the rear stage relative to the first and second ring-shaped elastic components 16 and 17, and a change in an electrical characteristic and breakdown due to entry of the water are not caused. Needless to say, fine dust or the like that has entered from the opening of the front cap 22 also does not reach the electronic parts, and performance deterioration, breakdown, and so forth attributed to adhesion of the fine dust or the like are also not caused.

Another Example of Electronic Pen 1 of First Embodiment

In the case of the electronic pen 1 of the first embodiment, as illustrated in FIG. 2, there is a possibility that water that has entered from the opening of the front cap 22 remains at the front stage relative to the first and second ring-shaped elastic components 16 and 17. Suppose that, in the electronic pen 1 with the configuration illustrated in FIG. 2, water that has entered from the opening of the front cap 22 remains in the space between the core body 4 and the transmitting component 5 and the transmitting-receiving electrode 13 at the front stage of the second ring-shaped elastic component 17. In this case, the core bar 41 having electrical conductivity in the core body 4 is held by the elastic component 51c that is disposed on the holding part 51a and that has the side surface exposed from the side surface of the holding part 51a. Thus, the core bar 41, the elastic component 51c, and the transmitting-receiving electrode 13 are electrically connected to each other through the water that has entered, and the electronic pen 1 does not function as the electronic pen.

That is, it becomes impossible to properly send out the position indication signal through the core bar 41 of the core body 4 and to properly send out the signal for tilt detection from the transmitting-receiving electrode 13, so that the electronic pen 1 does not function as the electronic pen. Needless to say, electronic parts located at the rear stage relative to the first and second ring-shaped elastic components 16 and 17 are not affected by the water. Thus, the functions of the electronic pen 1 as the electronic pen recover if the water that remains in the space between the core bar 41 and the elastic component 51c and the transmitting-receiving electrode 13 is discharged through evaporation or the like. However, the electronic pen 1 stop functioning as the electronic pen while the water remains and the core bar 41 and the elastic component 51c and the transmitting-receiving electrode 13 are electrically connected to each other.

Thus, in an electronic pen 1A that is another example of the electronic pen 1 of the first embodiment, a second ring-shaped elastic component 17A is disposed at a position closer to the pen tip side. This prevents water that has entered from the opening of the front cap 22 from entering the space between the core bar 41 and the elastic component 51c and the transmitting-receiving electrode 13 and remaining therein. The electronic pen 1A that is the other example of the electronic pen 1 of the first embodiment will specifically be described below.

Figure 5:
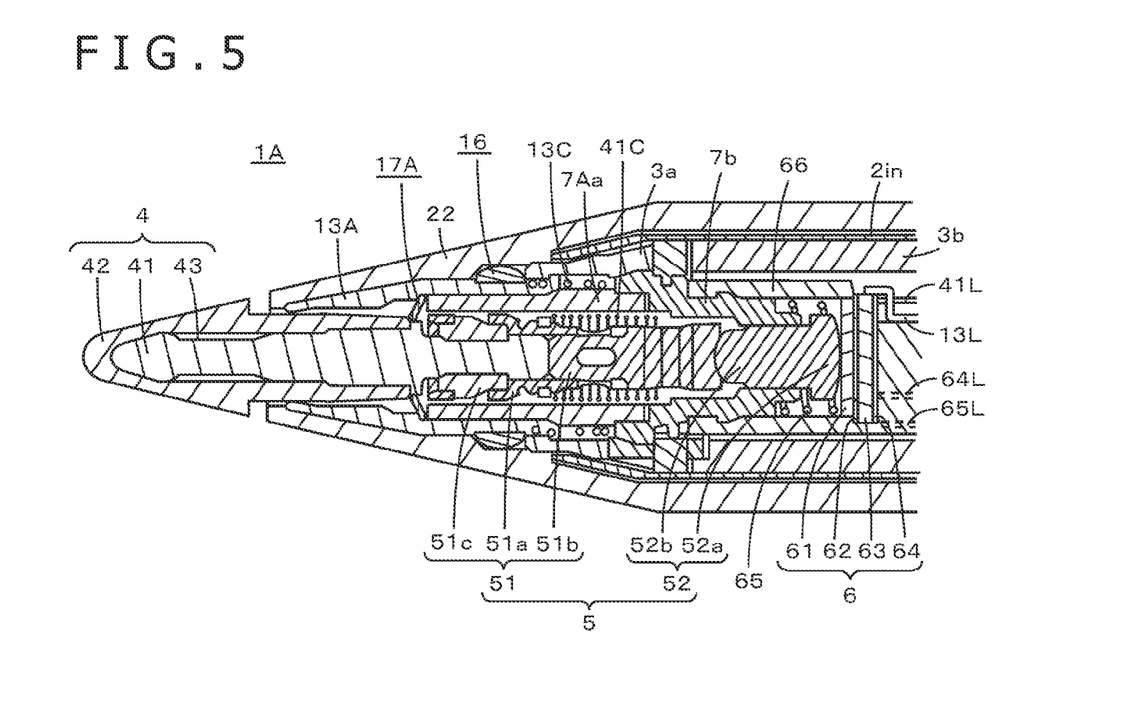
FIG. 5 is a diagram for explaining major parts, on the pen tip side, of another example of the electronic pen of the first embodiment.

FIG. 5 is a diagram for explaining major parts, on the pen tip side, of the electronic pen 1A that is the other example of the electronic pen 1 of the first embodiment. In the electronic pen 1A illustrated in FIG. 5, a part configured similarly to that of the electronic pen 1 illustrated in FIG. 2 is given the same reference sign, and detailed description thereof which is redundant is omitted. In the electronic pen 1A illustrated in FIG. 5, the second ring-shaped elastic component 17A is disposed closer to the pen tip side than the second ring-shaped elastic component 17 of the electronic pen 1 illustrated in FIG. 2 is.

Also in the electronic pen 1A of this example, the second ring-shaped elastic component 17A is formed similarly to the second ring-shaped elastic component 17 of the electronic pen 1 of the above-described first embodiment. That is, the second ring-shaped elastic component 17A has a small opening on the pen tip side and a large opening on the rear end side, and thus has an inclined side surface. That is, the second ring-shaped elastic component 17A has a shape like a dish from which the bottom (bottom surface) is removed. In the electronic pen 1A, the inner edge side of the opening of the second ring-shaped elastic component 17A on the pen tip side is in close contact with both the rear end of the protective component 42 of the core body 4 and the side surface of the core bar 41 across the whole circumference. Further, the outer edge side of the opening of the second ring-shaped elastic component 17A on the rear end side is in close contact with the inner wall surface of a central portion of a transmitting-receiving electrode 13A in the axial center direction across the whole circumference.

For this purpose, a step with which the outer edge side of the opening of the second ring-shaped elastic component 17A on the rear end side engages is made at the central portion of the transmitting-receiving electrode 13A in the axial center direction. Moreover, a pipe-shaped holding component 7aA located at the rear stage of the transmitting-receiving electrode 13A is extended toward the pen tip side, compared with the pipe-shaped holding component 7a in FIG. 2, in such a manner as to be fitted to the transmitting-receiving electrode 13A from the rear end side. With this, the outer edge side of the opening of the second ring-shaped elastic component 17A on the rear end side is surrounded by the inner wall surface of the transmitting-receiving electrode 13A and a tip surface of the pipe-shaped holding component 7aA and is held so as not to move in the axial center direction.

With the second ring-shaped elastic component 17A configured as described above, water that has entered from the opening of the front cap 22 is kept from entering the rear end side. Therefore, it is possible to prevent water that enters from the opening of the front cap 22 from entering the space across which the core bar 41 and the elastic component 51c and the transmitting-receiving electrode 13A are facing. This can prevent the core bar 41 of the core body 4, the elastic component 51c, and the transmitting-receiving electrode 13A from being electrically connected to each other with the water that has entered being an intermediary, and avoid the occurrence of the situation in which the electronic pen 1A itself does not function as the electronic pen due to entry of the water. Needless to say, also in the case of the electronic pen 1A, the first and second ring-shaped elastic components 16 and 17A can prevent water, dust, and so forth from entering a mounting area of electronic parts (including circuit parts) at the rear stage, and therefore, a change in an electrical characteristic and breakdown are also not caused.

Second Embodiment

In the case of the electronic pen 1A described with use of FIG. 5, water that enters from the opening of the front cap 22 does not reach mounting places of various electronic parts at the rear stage. Moreover, the core bar 41, the elastic component 51c, and the transmitting-receiving electrode 13A are not electrically connected to each other with water that has entered being an intermediary. However, the second ring-shaped elastic component 17A of the electronic pen 1A illustrated in FIG. 5 is located closer to the pen tip side than the second ring-shaped elastic component 17 of the electronic pen 1 illustrated in FIG. 2 is. Therefore, a load that is applied to the core body 4 and that can be detected as the writing pressure, that is, what is called an on-load, becomes heavier.

Therefore, in the case of using the electronic pen 1A illustrated in FIG. 5, writing cannot be executed when an applied writing pressure is not higher than that in the case of using the electronic pen 1 illustrated in FIG. 2. Therefore, it is conceivable that a request to lighten the on-load is made. Further, in the case of the electronic pen 1A illustrated in FIG. 5, in the state in which the core body 4 is removed from the electronic pen 1A, water that enters from the opening of the front cap 22 reaches mounting places of various electronic parts at the rear stage. Moreover, in this case, if the core body 4 is mounted in the electronic pen 1A in the state in which water that has entered remains, the core bar 41, the elastic component 51c, and the transmitting-receiving electrode 13A are electrically connected to each other. An electronic pen 1B of a second embodiment to be described below is configured to avoid the occurrence of these inconveniences.

Figure 6:
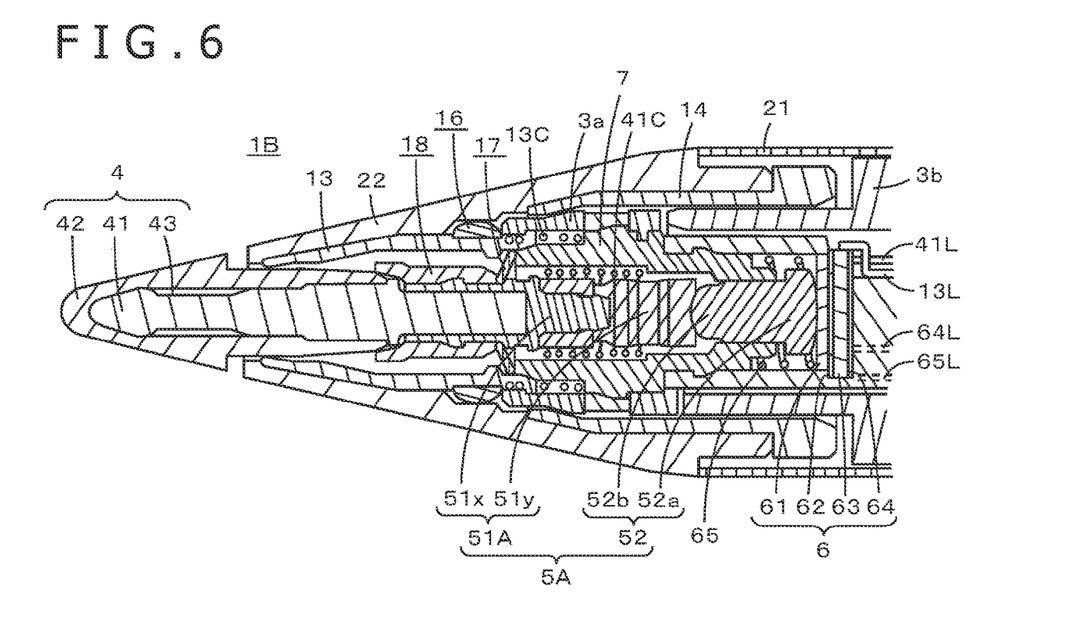
FIG. 6 is a diagram for explaining major parts, on the pen tip side, of an electronic pen of a second embodiment.

FIG. 6 is a diagram for explaining major parts, on the pen tip side, of the electronic pen 1B of the second embodiment. The basic configuration of the electronic pen 1B illustrated in FIG. 6 is similar to that of the electronic pen 1 of the first embodiment described with use of FIG. 1 to FIG. 4. However, the electronic pen 1B of the second embodiment is slightly different from the electronic pen 1 of the first embodiment in that the configuration is simplified and that the waterproof function and so forth are reinforced, for example. Thus, in the electronic pen 1B of the second embodiment illustrated in FIG. 6, a part configured similarly to that of the electronic pen 1 of the first embodiment illustrated in FIG. 2 is given the same reference sign, and detailed description thereof which is redundant is omitted. Hereinafter, the description will be made with focus on a different configuration.

Ground Electrode 14 and Pipe-Shaped Holding Component 7

The electronic pen 1B of the second embodiment includes a ground electrode (ground ring) 14 on the rear end side of the front cap 22. The case main body 21 made of an electrically-conductive material is electrically connected to the earth conductor of the printed circuit board 8 through the ground electrode 14. With this, the case main body 21 can be connected to the earth conductor of the printed circuit board 8 easily and surely. Further, in the electronic pen 1 of the first embodiment, the transmitting component 5 is mainly held by the pipe-shaped holding components 7a and 7b, and the region of movement thereof in the axial center direction is ensured. In contrast, in the electronic pen 1B of the second embodiment, a pipe-shaped holding component 7 obtained by integrally forming the pipe-shaped holding components 7a and 7b is used, and the configuration is thus simplified.

Transmitting Component 5A

As illustrated in FIG. 6, a transmitting component 5A included in the electronic pen 1B of the second embodiment includes components of separate bodies, that is, a core body holding component 51A located on the pen tip side and the pressing component 52 located at the rear stage of the core body holding component 51A. The pressing component 52 is similar to the pressing component 52 of the electronic pen 1 of the first embodiment, and is formed of, for example, a hard resin that is a non-electrically-conductive material. In contrast, the core body holding component 51A includes a cup-shaped holding part 51x including a recessed portion, and an extended part 51y that includes a fitting recessed portion into which the rear end side of the holding part 51x is fitted and that is extended in the opposite direction to the pen tip.

In the electronic pen 1B of the second embodiment, at least the holding part 51x of the core body holding component 51A is formed of an electrically-conductive material such as an electrically-conductive resin or metal, and the extended part 51y is formed of, for example, a hard resin that is a non-electrically-conductive material. The extended part 51y may also be formed of an electrically-conductive material. In the electronic pen 1 of the first embodiment, the ring-shaped elastic component 51c having electrical conductivity, such as electrically-conductive rubber, for example, is fixed to the inner wall surface of the holding part 51a of the transmitting component 5. With this, the core bar 41 of the core body 4 is fixed to the holding part 51a by the elastic component 51c and is connected to the coil spring 41C for the core body through the elastic component 51c to receive the position indication signal.

However, in the electronic pen 1B of the second embodiment, the holding part 51x itself of the transmitting component 5A is formed of the electrically-conductive material, and therefore, the core bar 41 of the core body 4 is directly fitted into the recessed portion of the holding part 51x and is held. The coil spring 41C for the core body is connected to the holding part 51x, and the position indication signal from the sending circuit 8s is supplied from the coil spring 41C for the core body to the core bar 41 through the holding part 51x. Constituent parts including the core body 4, the pressure detector 6, the coil spring 41C for the core body, the transmitting-receiving electrode 13, the coil spring 13C for the transmitting-receiving electrode, and so forth are similar to those of the electronic pen 1 of the above-described first embodiment.

As described above, the electronic pen 1B of the second embodiment includes, on the pen tip side, the core body 4, the transmitting component 5A, the pressure detector 6, the pipe-shaped holding component 7, the coil spring 41C for the core body, the transmitting-receiving electrode 13, the coil spring 13C for the transmitting-receiving electrode, the coil spring 65 for the pressure detector, and so forth. These constituent parts on the pen tip side are held in the casing 2 by the pen-tip-side holding parts 3a and 3b of the board holder 3.

In the electronic pen 1 of the first embodiment, the parts for implementing the electronic pen functions are housed in the inside casing 2in and are mounted into the casing 2. However, the electronic pen 1B of the second embodiment does not include the inside casing 2in but the ground electrode 14. Needless to say, it is also possible to configure the core body holding component 51 of the transmitting component 5 of the electronic pen 1 illustrated in FIG. 2 or the electronic pen 1A illustrated in FIG. 5, similarly to the core body holding component 51A of the electronic pen 1B illustrated in FIG. 6.

Moreover, as illustrated in FIG. 6, the electronic pen 1B of the second embodiment includes the first and second ring-shaped elastic components 16 and 17 as in the case of the electronic pen 1 of the first embodiment illustrated in FIG. 2. As illustrated in FIG. 6, the inner wall surface of the first ring-shaped elastic component 16 is in close contact with the side surface of the transmitting-receiving electrode 13 on the rear end side across the whole circumference, and the outer wall surface thereof is in close contact with the inner wall surface of the front cap 22 across the whole circumference. As illustrated in FIG. 6, in a section of the first ring-shaped elastic component 16 taken along the axial center direction passing through the center of the opening of the first ring-shaped elastic component 16, the side surface (outer wall surface) of the first ring-shaped elastic component 16 on the side in close contact with the inner wall surface of the front cap 22 has a circular arc shape.

With this shape, it becomes easy to mount the transmitting-receiving electrode 13 on which the first ring-shaped elastic component 16 is mounted, into the front cap 22, and it becomes possible to enhance the close contact between the outer wall surface of the first ring-shaped elastic component 16 and the inner wall surface of the front cap 22. As described above, the first ring-shaped elastic component 16 implements a function of closing the gap between the side surface of the transmitting-receiving electrode 13 and the inner wall surface of the front cap 22. This prevents water that has entered from the opening of the front cap 22 from entering the pressure detector 6 and the printed circuit board 8 through between the transmitting-receiving electrode 13 and the inner wall surface of the front cap 22.

Moreover, as illustrated in FIG. 6, the second ring-shaped elastic component 17 in close contact with the whole circumference of a side surface of a central portion, in the axial center direction, of the holding part 51x of the core body holding component 51A of the transmitting component 5A and the whole circumference of the inner wall surface of the transmitting-receiving electrode 13 on the rear end side is disposed. The second ring-shaped elastic component 17 has a small opening on the pen tip side and a large opening on the rear end side, and thus has an inclined side surface as illustrated in FIG. 6. That is, the second ring-shaped elastic component 17 has a shape like a dish from which the bottom (bottom surface) is removed. In this case, the inner edge side of the opening on the pen tip side is in close contact with the whole circumference of the side surface of the holding part 51x of the core body holding component 51A, and the outer edge side of the opening on the rear end side is in close contact with the whole circumference of the inner wall surface of the transmitting-receiving electrode 13 on the rear end side. This prevents water that has entered from the opening of the front cap 22 from entering the pressure detector 6 and the printed circuit board 8 through a space between the core body 4 and the transmitting component 5A and the transmitting-receiving electrode 13.

Further, the second ring-shaped elastic component 17 of the electronic pen 1B of the second embodiment has a configuration similar to that of the second ring-shaped elastic component 17 of the electronic pen 1 of the first embodiment described with use of FIG. 3. Thus, the second ring-shaped elastic component 17 has such a shape that the core body 4 and the transmitting component 5A can properly make slide movement in the axial center direction according to the applied writing pressure. This makes it possible not to inhibit the deformation of the second ring-shaped elastic component 17 caused in association with the movement of the core body 4 and the transmitting component 5A in the axial center direction. That is, without increasing the on-load, the core body 4 can be pushed toward the rear end side in the axial center direction with a light load.

As described above, in the electronic pen 1B of the second embodiment, water that has entered from the opening of the front cap 22 does not enter the pressure detector 6 and the printed circuit board 8 by the functions of the first and second ring-shaped elastic components 16 and 17, similarly to the electronic pen 1 of the first embodiment. However, at least the holding part 51x of the transmitting component 5A is formed of an electrically-conductive material. Thus, when water that has entered from the opening of the front cap 22 remains between the core body 4 and the transmitting component 5A and the transmitting-receiving electrode 13, the core bar 41, the holding part 51x, and the transmitting-receiving electrode 13 are electrically connected to each other through the water, and the electronic pen 1B does not function as the electronic pen.

Thus, in the electronic pen 1B of the second embodiment, a tubular insulating component 18 is disposed as illustrated in FIG. 6. On the rear end side of the insulating component 18, a rear end surface thereof is in close contact with an inner edge portion of the second ring-shaped elastic component 17. On the pen tip side of the insulating component 18, a tip portion thereof is fitted to and in close contact with a rear end portion of the protective component 42 of the core body 4. With this, the insulating component 18 covers the side surface of the holding part 51x without exposure of the holding part 51x. In the second embodiment, the insulating component 18 is an elastic component formed of a non-electrically-conductive material such as an elastomer (what is called synthetic rubber), for example, and is in close contact with the inner edge portion of the second ring-shaped elastic component 17, the rear end portion of the protective component 42 of the core body 4, and the side surface portion of the holding part 51x as described above.

With such a tubular insulating component 18 disposed, water that has entered from the opening of the front cap 22 is kept from getting contact with the core bar 41 of the core body 4 and the holding part 51x of the transmitting component 5A in the electronic pen 1B of the second embodiment. Moreover, when water has entered from the opening of the front cap 22 in the state in which the core body 4 is not mounted in the casing 2, the water that has entered can be discharged from the entry route. Further, suppose that water has entered from the opening of the front cap 22 in the state in which the core body 4 is not mounted in the casing 2. Also in this case, when the core body 4 is mounted, insulation is surely established between the core bar 41 of the core body 4 and the holding part 51x of the transmitting component 5A and the transmitting-receiving electrode 13, and therefore, a conductive state is not made between the core bar 41 and the holding part 51x of the transmitting component 5A and the transmitting-receiving electrode 13.

Effects of Electronic Pen 1B of Second Embodiment

As described above, in the electronic pen 1B of the second embodiment, water that has entered from the opening of the front cap 22 does not reach mounting places of various electronic parts at the rear stage, and a light on-load equivalent to that of the case of the electronic pen 1 illustrated in FIG. 2 can be implemented. Moreover, in the electronic pen 1B, the core bar 41, the holding part 51x, and the transmitting-receiving electrode 13 are not electrically connected to each other with water that has entered from the opening of the front cap 22 being an intermediary. Further, even in the state in which the core body 4 is removed, water that enters from the opening of the front cap 22 does not reach mounting places of various electronic parts at the rear stage. In addition, in this case, even when the core body 4 is mounted in the state in which the water that has entered remains, electrical connection between the core bar 41 and the holding part 51x and the transmitting-receiving electrode 13 is also not made. Needless to say, also in the case of the electronic pen 1B, the first and second ring-shaped elastic components 16 and 17 can prevent water, dust, and so forth from entering a mounting area of electronic parts at the rear stage, and therefore, a change in an electrical characteristic and breakdown are also not caused.

Another Example of Electronic Pen 1B of Second Embodiment

Figure 7:
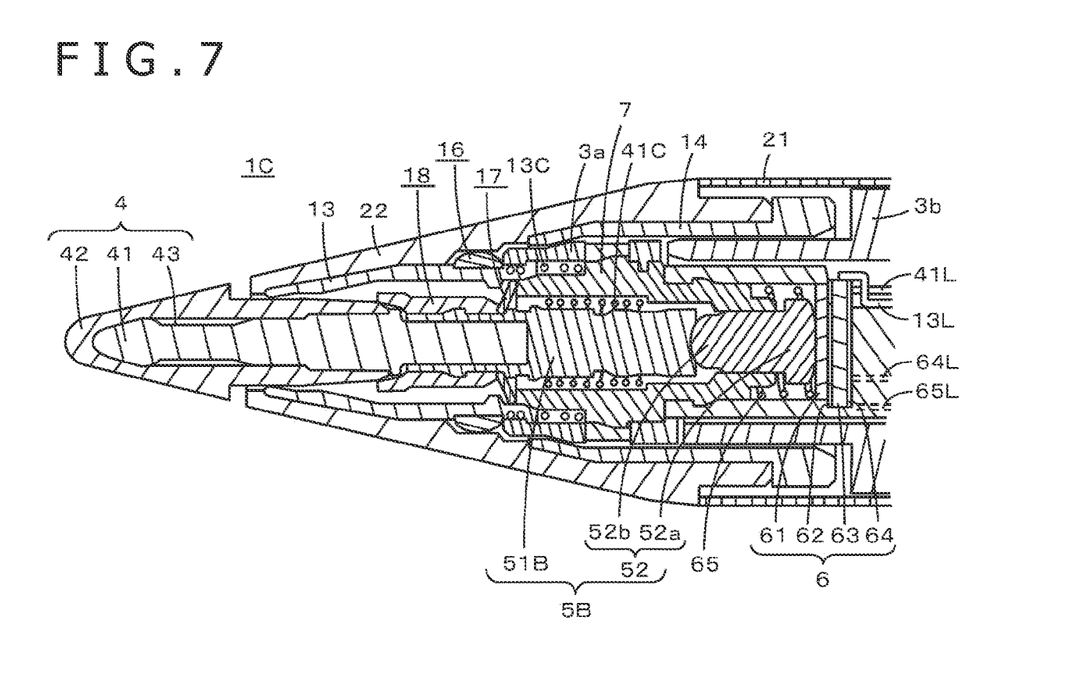
FIG. 7 is a diagram for explaining major parts, on the pen tip side, of another example of the electronic pen of the second embodiment.

FIG. 7 is a diagram for explaining major parts, on the pen tip side, of an electronic pen 1C that is another example of the electronic pen 1B of the second embodiment. In the electronic pen 1C illustrated in FIG. 7, a part configured similarly to that of the electronic pen 1B illustrated in FIG. 6 is given the same reference sign, and detailed description thereof which is redundant is omitted. In the electronic pen 1C illustrated in FIG. 7, a transmitting component 5B includes a core body holding component 51B and the pressing component 52, and the configuration of the core body holding component 51B is different from the core body holding component 51A of the electronic pen 1B illustrated in FIG. 6.

The core body holding component 51A of the electronic pen 1B illustrated in FIG. 6 includes two components, that is, the holding part 51x and the extended part 51y. In contrast, the core body holding component 51B of the electronic pen 1C illustrated in FIG. 7 is integrally formed of an electrically-conductive material entirely. That is, the core body holding component 51B of the electronic pen 1C functions as a holding part that holds the core body 4 as illustrated in FIG. 7 and that electrically connects the core body 4 and the sending circuit 8s at the rear stage through the coil spring 41C for the core body. Moreover, the core body holding component 51B of the electronic pen 1C functions as a pressing part that transmits the writing pressure applied to the core body 4 to the pressing component 52.

As described above, the core body holding component 51B of the electronic pen 1C is an integrated part having the two functions in combination. This can implement functions as the electronic pen with reduction in the number of parts from the core body 4 to the pressure detector 6. Further, it is also possible to configure the core body holding component 51 of the transmitting component 5 of the electronic pen 1 illustrated in FIG. 2 or the electronic pen 1A illustrated in FIG. 5, similarly to the core body holding component 51B of the electronic pen 1C illustrated in FIG. 7, needless to say.

As described above, the core body holding component 51B is an integrated part formed of the electrically-conductive material entirely. However, the first and second ring-shaped elastic components 16 and 17 and the insulating component 18 can prevent the core body holding component 51B itself from coming into contact with water that has entered. Therefore, also in the case of the electronic pen 1C of this example, the core bar 41, the core body holding component 51B, and the transmitting-receiving electrode 13 can be kept from being electrically connected to each other through the water. Therefore, also in the case of the electronic pen 1C of this example, functions as the electronic pen are not lost even when water enters from the opening of the front cap 22, as in the case of the electronic pen 1B illustrated in FIG. 6. This can implement an electronic pen with high reliability.

MODIFICATION EXAMPLES

The electronic pens 1, 1A, 1B, and 1C of the above-described first and second embodiments are all electronic pens of the capacitive system and include the electrically-conductive core bar 41 and the transmitting-receiving electrode 13 or 13A in order to allow detection of the tilt and reception of information (signal) from the position detecting device side. The core bar 41 of the core body 4 is located on the axial center when being mounted in the electronic pen 1, 1A, 1B, or 1C, and is thus referred to as a center conductor in some cases. Further, the transmitting-receiving electrode 13 of 13A is a part through which the core body 4 penetrates, and is located to surround the core bar 41. Thus, it is also referred to as a peripheral electrode. The transmitting-receiving electrode 13 or 13A becomes an electrode exclusively used for transmission of the signal for tilt detection, in the case where the electronic pen does not receive information (signal) from the position detecting device side.

As described above, the electronic pens 1, 1A, 1B, and 1C of the above-described first and second embodiments include the core bar 41 (center electrode) and the transmitting-receiving electrode 13 or 13A (peripheral electrode). However, the configuration is not limited thereto. In the case where the electronic pen does not need to detect the tilt of the electronic pen and receive information (signal) from the position detecting device, the transmitting-receiving electrode 13 or 13A does not need to be included in the electronic pen. In this case, it is sufficient if a tubular internal constituent part formed of a non-electrically-conductive material is formed and used instead of the transmitting-receiving electrode 13 or 13A.

Further, when the transmitting-receiving electrode 13 or 13A or the tubular internal constituent part is not used, it is also possible to dispose one ring-shaped elastic component in close contact with the whole circumference of the side surface of the core body holding component 51, 51A, or 51B and the whole circumference of the inner wall surface of the casing. In this case, this ring-shaped elastic component is only required to have the following configuration. Specifically, the ring-shaped elastic component has a small opening on the pen tip side and a large opening on the rear end side, and thus has an inclined side surface. Also, the inner edge of the opening on the pen tip side is in close contact with the whole circumference of the side surface of the core body holding component, and the outer edge of the opening on the rear end side is in close contact with the whole circumference of the inner wall surface of the casing. That is, this ring-shaped elastic component has a shape similar to that of the second ring-shaped elastic component 17 described with use of FIG. 2 and FIG. 3 although the size is different. This can keep the on-load from becoming high as much as possible.

The present disclosure can be applied to not only the electronic pen of the capacitive system but also, for example, the electronic pen of the electromagnetic induction system. In this case, it is sufficient if a tubular internal constituent part formed of a non-electrically-conductive material is used instead of the transmitting-receiving electrode 13 or 13A. Moreover, in the case of the electronic pen of the electromagnetic induction system, a core bar formed of, for example, resin is disposed to penetrate through a tubular ferrite core, and a coil is wound around the ferrite core. Further, a capacitor is connected to this coil, and a resonant circuit is formed. In this case, it is only required to dispose a tubular insulating component to shield the coil wound around the ferrite core from water. With the insulating component disposed between the ferrite core and the inside of the pen casing, water does not permeate the coil wound around the ferrite core. This insulating component is equivalent to the insulating component 18 of the electronic pen 1B or 1C of the above-described second embodiment.

Moreover, the above-described first and second ring-shaped elastic components 16, 17, and 17A can be formed by using an elastomer material, for example. Needless to say, the material is not limited to the elastomer material, and the first and second ring-shaped elastic components 16, 17, and 17A can be formed by using various elastic materials such as natural rubber and PORON (registered trademark) having water repellency. In addition, the insulating component 18 can also be formed by using various insulating materials having water resistance, such as elastomer and natural rubber.

Further, as another example, the second ring-shaped elastic component 17 and the insulating component 18 may integrally be formed. With the second ring-shaped elastic component 17 and the insulating component 18 integrally formed, it is possible to reduce the number of parts and prevent water from entering the parts from a gap between the second ring-shaped elastic component 17 and the insulating component 18. As a method for forming them integrally, shaping based on double mold (two-color mold) can be used. When softness is compared between the second ring-shaped elastic component 17 and the insulating component 18, the second ring-shaped elastic component 17 is softer than the insulating component 18.

OTHERS

As is also understood from the explanation of the above-described embodiments, the part including the case main body 21, the front cap 22, and the rear cap 23 of the embodiments corresponds to a casing of the claims, and mainly the front cap 22 corresponds to the casing of the claims. Moreover, mainly the core body holding components 51, 51A, and 51B of the embodiments correspond to a core body holding part of the claims. Further, various electronic parts mounted in order to implement functions of the electronic pen, such as the pressure detector 6 and the printed circuit board 8, correspond to electronic parts of the claims. Moreover, mainly the transmitting-receiving electrodes 13 and 13A correspond to a tubular internal constituent part of the claims, and the tubular internal constituent part of the claims is a tubular internal constituent part that does not have electrical conductivity, in some cases.

The first ring-shaped elastic component 16 of the embodiments corresponds to a first ring-shaped elastic component of the claims, and the second ring-shaped elastic component 17 of the embodiments corresponds to a second ring-shaped elastic component of the claims. Further, the pressure detector 6 of the embodiments corresponds to a writing pressure detector of the claims. The sending circuit 8s of the embodiments corresponds to first and second transmitting circuits of the claims. Moreover, the insulating component 18 of the embodiment corresponds to an insulating component of the claim. Further, the first ring-shaped elastic component 16 of the embodiments corresponds to an outside ring-shaped elastic component of the claim, and the second ring-shaped elastic component 17A of the embodiment corresponds to an inside ring-shaped elastic component of the claims.

It is to be noted that embodiments of the present disclosure are not limited to the foregoing embodiments, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen comprising:
   a tubular casing having an opening on a pen tip side;
   a bar-shaped core body;
   a core body holding part that is disposed in the casing and holds a rear end portion of the core body such that a tip portion of the core body protrudes from the opening of the casing;
   electronic parts that are disposed at a rear stage of the core body holding part in the casing and that, in operation, perform electronic pen functions;
   a tubular internal constituent part through which the core body penetrates on the pen tip side in the casing;
   a first ring-shaped elastic component in contact with an entirety of a circumference of a side surface of the internal constituent part and an entirety of a circumference of an inner wall surface of the casing; and
   a second ring-shaped elastic component in contact with an entirety of a circumference of a side surface of the core body holding part and an entirety of a circumference of an inner wall surface of the internal constituent part.

2. The electronic pen according to claim 1, wherein:
   a side surface of the first ring-shaped elastic component on a side in contact with the inner wall surface of the casing has a circular arc shape when the first ring-shaped elastic component is cut in a direction along an axial center direction of the electronic pen that passes through a center of the first ring-shaped elastic component, and
   the second ring-shaped elastic component has a first opening on the pen tip side, a second opening on a rear end side, and has an inclined side surface, the second opening being larger than the first opening, an inner edge of the first opening on the pen tip side being in contact with the entirety of the circumference of the side surface of the core body holding part, an outer edge of the second opening on the rear end side being in contact with the entirety of the circumference of the inner wall surface of the internal constituent part.

3. The electronic pen according to claim 1, wherein:
   a writing pressure detector is disposed at the rear stage of the core body holding part,
   the core body and the core body holding part that holds the core body, in operation, make a sliding movement in an axial center direction of the electronic pen according to a writing pressure applied to the core body and the writing pressure detector,
   the second ring-shaped elastic component has a first opening on the pen tip side, a second opening on a rear end side, and has an inclined side surface, the second opening being larger than the first opening, an inner edge of the first opening on the pen tip side being in contact with the entirety of the circumference of the side surface of the core body holding part, an outer edge of the second opening on the rear end side being in contact with the entirety of the circumference of the inner wall surface of the internal constituent part, and the second ring-shaped elastic component is deformed such that the second ring-shaped elastic component is kept in contact with the core body holding part and the inner wall surface of the internal constituent part, when the core body and the core body holding part make the sliding movement in the axial center direction of the electronic pen.

4. The electronic pen according to claim 1, wherein: the core body includes a center electrode that, in operation, transmits at least a position indication signal, the internal constituent part is a peripheral electrode that, in operation, transmits at least a tilt detection signal that is usable to detect a tilt of the electronic pen, the electronic parts include a first transmitting circuit that, in operation, generates the position indication signal and supplies the position indication signal to the center electrode through a first signal line, and a second transmitting circuit that, in operation, generates the tilt detection signal and supplies the tilt detection signal to the peripheral electrode through a second signal line, and the second ring-shaped elastic component is formed of a non-electrically-conductive material.

5. The electronic pen according to claim 1, wherein: the core body includes a center electrode that, in operation, transmits at least a position indication signal, and a protective component that covers part of the center electrode from an end portion of the center electrode on the pen tip side to a position separate from the end portion in a rear end direction by a predetermined length, the core body holding part is formed of an electrically-conductive material and holds a rear end portion of the center electrode, the internal constituent part is a peripheral electrode that, in operation, transmits at least a tilt detection signal usable to detect a tilt of the electronic pen, the electronic parts include a first transmitting circuit that, in operation, generates the position indication signal and supplies the position indication signal to the center electrode through the core body holding part, and a second transmitting circuit that, in operation, generates the tilt detection signal and supplies the tilt detection signal to the peripheral electrode, at least a portion of the protective component located in the casing when the core body is held by the core body holding part is formed of a non-electrically-conductive material, the second ring-shaped elastic component is formed of a non-electrically-conductive material, and the electronic pen includes a tubular insulating component that is in contact with a rear end portion of the protective component of the core body and the second ring-shaped elastic component and that insulates a portion including the center electrode of the core body and the core body holding part.

6. The electronic pen according to claim 1, wherein:
a writing pressure detector is disposed at the rear stage of the core body holding part, and
the core body holding part includes a holding part that holds the core body and a pressing part that presses the writing pressure detector.

7. The electronic pen according to claim 1, wherein:
a writing pressure detector is disposed at the rear stage of the core body holding part, and
the core body holding part includes a holding part that holds the core body, an extended part extended from a rear stage of the holding part, and a pressing part that presses the writing pressure detector.

8. The electronic pen according to claim 1, wherein:
at least one of the first ring-shaped elastic component or the second ring-shaped elastic component is formed of an elastomer material.

9. An electronic pen comprising:
a tubular casing having an opening on a pen tip side of the casing;
a bar-shaped core body including a core bar and a protective component that covers part of the core bar from an end portion of the core bar on the pen tip side of the casing to a position separate from the end portion in a rear end direction of the core body by a predetermined length;
a core body holding part that is disposed in the casing and holds a rear end portion of the core body such that a tip portion of the core body protrudes from the opening of the casing;
electronic parts that are disposed at a rear stage of the core body holding part in the casing and that, in operation, perform electronic pen functions;
a tubular internal constituent part through which the core body penetrates on the pen tip side in the casing;
an outside ring-shaped elastic component being in contact with an entirety of a circumference of a side surface of the internal constituent part and an entirety of a circumference of an inner wall surface of the casing; and
an inside ring-shaped elastic component being in contact with an entirety of a circumference of a rear end portion of the protective component of the core body and an entirety of a circumference of an inner wall surface of the internal constituent part.

10. The electronic pen according to claim 9, wherein
the core bar is a center electrode for sending out at least a position indication signal,
the internal constituent part is a peripheral electrode that, in operation, transmits at least a tilt detection signal usable to detect a tilt of the electronic pen,
the electronic parts include a first transmitting circuit that, in operation, generates the position indication signal and supplies the position indication signal to the center electrode, and a second transmitting circuit that, in operation, generates the tilt detection signal and supplies the tilt detection signal to the peripheral electrode, and
the inside ring-shaped elastic component is formed of a non-electrically-conductive material.

* * * * *